(12) United States Patent
Lim et al.

(10) Patent No.: US 10,262,243 B2
(45) Date of Patent: Apr. 16, 2019

(54) NEURAL NETWORK POINT CLOUD GENERATION SYSTEM

(71) Applicant: General Electric Company, Schenectady, NY (US)

(72) Inventors: Ser Nam Lim, Schenectady, NY (US); Jingjing Zheng, Niskayuna, NY (US); Jiajia Luo, Niskayuna, NY (US); David Scott Diwinsky, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/604,012

(22) Filed: May 24, 2017

(65) Prior Publication Data

US 2018/0341836 A1  Nov. 29, 2018

(51) Int. Cl.
*G06K 9/62* (2006.01)
*G06K 9/66* (2006.01)
*G06T 3/40* (2006.01)
*G06T 7/00* (2017.01)

(52) U.S. Cl.
CPC ............ *G06K 9/66* (2013.01); *G06K 9/627* (2013.01); *G06K 9/6215* (2013.01); *G06T 3/4007* (2013.01); *G06T 3/4053* (2013.01); *G06T 7/0002* (2013.01); *G06T 2200/04* (2013.01); *G06T 2207/10028* (2013.01); *G06T 2207/20084* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 5,590,218 A | 12/1996 | Ornstein | |
| 2016/0196643 A1* | 7/2016 | Bendall | G06T 7/602 382/108 |

OTHER PUBLICATIONS

Song, Xibin, Yuchao Dai, and Xueying Qin. "Deep depth super-resolution: Learning depth super-resolution using deep convolutional neural network." In Asian Conference on Computer Vision, pp. 360-376. Springer, Cham, 2016.*

(Continued)

*Primary Examiner* — Manav Seth
*Assistant Examiner* — David Perlman
(74) *Attorney, Agent, or Firm* — GE Global Patent Operation; Nitin Joshi

(57) ABSTRACT

A system includes one or more processors and a memory that stores a generative adversarial network (GAN). The one or more processors are configured to receive a low resolution point cloud comprising a set of three-dimensional (3D) data points that represents an object. A generator of the GAN is configured to generate a first set of generated data points based at least in part on one or more characteristics of the data points in the low resolution point cloud, and to interpolate the generated data points into the low resolution point cloud to produce a super-resolved point cloud that represents the object and has a greater resolution than the low resolution point cloud. The one or more processors are further configured to analyze the super-resolved point cloud for detecting one or more of an identity of the object or damage to the object.

22 Claims, 5 Drawing Sheets

(56) References Cited

OTHER PUBLICATIONS

Ledig, Christian, Lucas Theis, Ferenc Huszar, Jose Caballero, Andrew Cunningham, Alejandro Acosta, Andrew Aitken et al. "Photo-Realistic Single Image Super-Resolution Using a Generative Adversarial Network." arXiv preprint arXiv:1609.04802 (2016).*
Dong, Chao, Chen Change Loy, Kaiming He, and Xiaoou Tang. "Learning a deep convolutional network for image super-resolution." in European Conference on Computer Vision, pp. 184-199. Springer, Cham, 2014.*
Goodfellow et al.; "Generative Adversarial Nets" Advances in Neural Information Processing System; 2014; 9 pages.
"CS231n Convolutional Neural Networks for Visual Recognition" 20167 26 pages.
Nelsen; "Using Neural Nets to Recognize Handwritten Digits" 2017; 54 pages.
Long et al.; Fully Convolutional Networks for Semantic Segmentation Proceedings for the IEEE Conference on Computer Vision and Pattern Recognition; 2015; 10 pages.
"CS231n Convolutional Neural Networks for Visual Recognition" 2017; 15 pages.
Ledig et al. "Photo-realistic single image super-resolution using a generative adversarial network." arXiv preprint arXiv:1609.04802; 2016; 19 pages.
Wu et al. "Learning a probabilistic latent space of object shapes via 3d generative-adversarial modeling." Advances in Neural Information Processing Systems. 2016; 9 pages.
Elad, M. and Feuer, A., "Restoration of a Single Superresolution Image from Several Blurred, Noisy, and Undersampled Measured Images," IEEE Transactions on Image Processing, vol. 6, No. 12, pp. 1646-1658 (Dec. 1997).
Katartzis, A., and Petrou, M., "Current trends in super-resolution image reconstruction," Image Fusion, pp. 1-26 (Jan. 1, 2008).
Maturana, D. and Scherer, S., "VoxNet: A 3D Convolutional Neural Network for Real-Time Object Recognition," IEEE/RSJ International Conference on Intelligent Robots and Systems (IROS), pp. 922-928 (Sep. 28-Oct. 2, 2015).
Yu, Q., et al., "A 3D Vision-Based Quality 1-14 Inspection Study for Molded Part with Multiple Geometry Shapes," Advanced Materials Research, vol. 1039, pp. 529-537 (Oct. 31, 2014).
Extended European Search Report and Opinion issued in connection with corresponding EP Application No. 18173804.8 dated Aug. 16, 2018.

* cited by examiner

NEURAL NETWORK POINT CLOUD GENERATION SYSTEM

FIELD

The subject matter described herein relates to image analysis systems that use one or more neural networks.

BACKGROUND

Three-dimensional (3D) depth maps acquired by range imaging devices map a scanned environment in 3D, and can be used for a wide variety of computer-vision-related tasks. For example, 3D depth maps are used in autonomous vehicle navigation, autonomous robotic navigation, 3D reconstruction, computer graphics, video games, virtual reality, object tracking and recognition, and the like. However, the 3D depth maps acquired by known range imaging devices have several drawbacks, including low quality, low resolution, and/or low frequency, which limit the usefulness of the depth maps. For example, the precision of a robot's autonomous movements will be limited by the quality and resolution of the depth map on which the robot relies for determining how to move in the environment. Due at least in part to the additional depth-related information that is not acquired when capturing two-dimensional (2D) image data, the resolutions of depth maps acquired by range imaging devices are typically considerably less than the resolutions achievable by standard 2D video cameras. For example, some known range imaging devices referred to herein as 3D time-of-flight cameras can acquire 3D data at an acceptable frequency, but provide a relatively sparse or low resolution depth map. The sparse depth maps limit the utility the depth maps for computer-vision tasks.

SUMMARY

In an embodiment, a system (e.g., a point cloud generation system) is provided that includes one or more processors and a memory that stores a generative adversarial network (GAN). The one or more processors are configured to receive a low resolution point cloud comprising a set of three-dimensional (3D) data points. The low resolution point cloud represents an object. The one or more processors are configured to input the low resolution point cloud to the GAN for a generator of the GAN to generate a first set of generated data points based at least in part on one or more characteristics of the data points in the low resolution point cloud. The generator is further configured to interpolate the generated data points into the low resolution point cloud to produce a super-resolved point cloud that represents the object and has a greater resolution than the low resolution point cloud. The one or more processors are further configured to analyze the super-resolved point cloud for detecting one or more of an identity of the object or damage to the object.

In an embodiment, a method (e.g., for generating point clouds) is provided that includes obtaining a low resolution point cloud comprising a set of three-dimensional (3D) data points. The low resolution point cloud represents an object. The method includes inputting the low resolution point cloud to a generator of a generative adversarial network (GAN) trained to generate a first set of generated data points based at least in part on one or more characteristics of the data points in the low resolution point cloud. The generator is further configured to interpolate the generated data points into the low resolution point cloud to produce a super-resolved point cloud that represents the object and has a greater resolution than the low resolution point cloud. The method also includes analyzing the super-resolved point cloud for detecting one or more of an identity of the object or damage to the object.

In an embodiment, a system (e.g., a point cloud generation system) is provided that includes a generator of a generative adversarial network (GAN) comprising one or more processors and a discriminator of the GAN comprising one or more processors. The generator is configured to receive a low resolution point cloud representing an object. The low resolution point cloud includes three-dimensional (3D) data points. The generator is configured to generate a first set of generated 3D data points and to interpolate the generated data points into the low resolution point cloud to produce a super-resolved point cloud that represents the object and has a greater resolution than the low resolution point cloud. The discriminator is configured to predict whether the object in the super-resolved point cloud is one or more of similar or identical to an object represented in one or more high resolution training point clouds. Responsive to predicting that the object in the super-resolved point cloud is one or more of similar or identical to the object represented in the one or more high resolution training point clouds, the generator is configured to communicate the super-resolved point cloud to a neural network for automated object recognition by the neural network.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
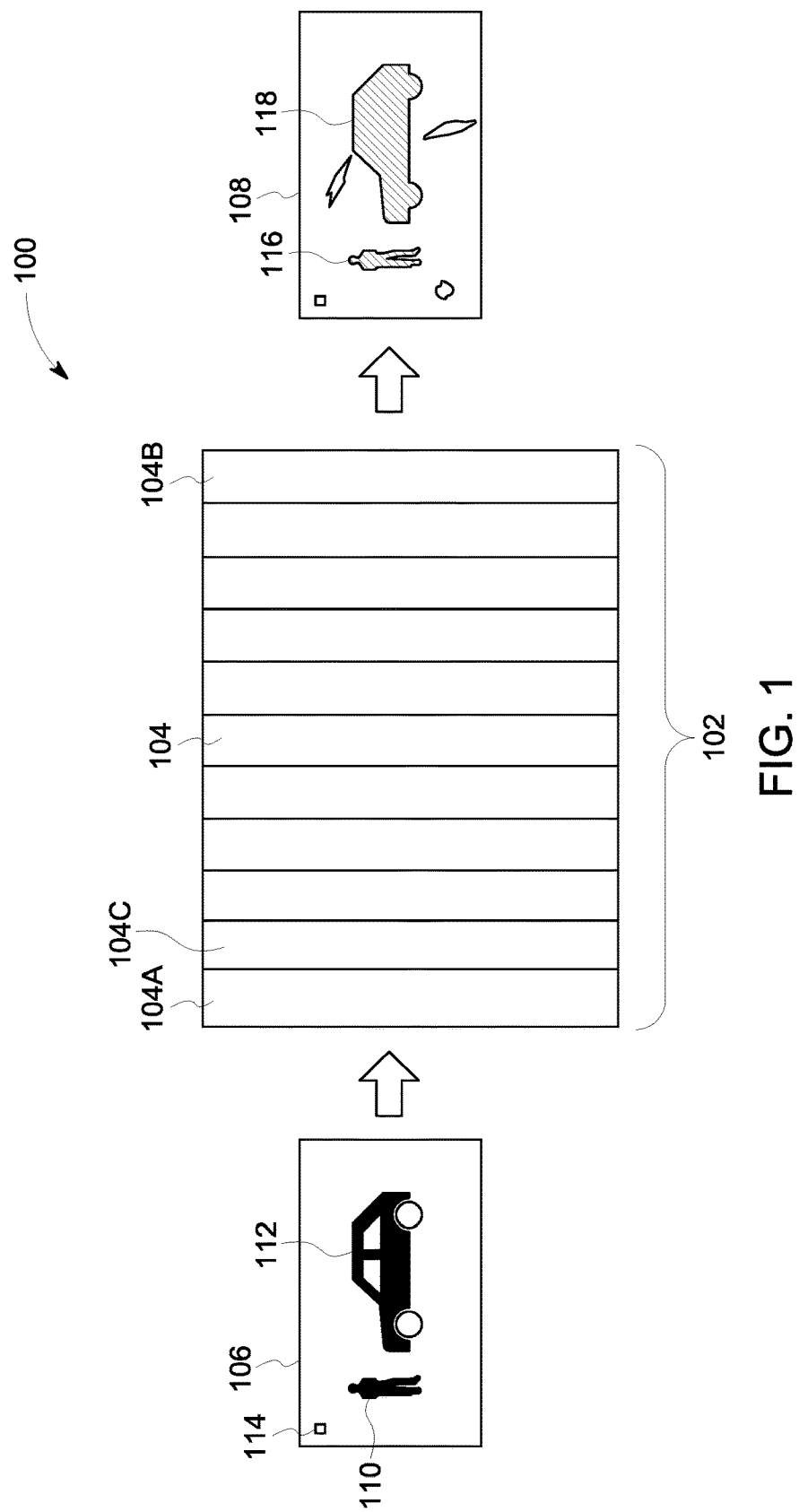
FIG. 1 illustrates one embodiment of a neural network system used for image analysis.

One embodiment of the inventive subject matter described herein provides a super-resolution point cloud generation system and method that use artificial neural networks to generate high resolution 3D depth maps or point clouds from low resolution 3D depth maps. As used herein, terms such as "high" and "low" are used merely for comparison to distinguish and identify different groups or sets of data. For example, the use of phrases "high resolution point cloud" and "low resolution point cloud" as used herein merely identifies and distinguishes two different point clouds and indicates that the high definition point cloud has a greater resolution than the low resolution point cloud, and does not indicate values or ranges of the respective resolutions of the points clouds. Furthermore, as used herein, the terms "depth map" and "point cloud" are used interchangeably and represent a set of 3D data points in a 3D coordinate system. For example, each data point in a point cloud has a 3D position coordinate along x, y, and z axes in the coordinate system.

The high resolution point clouds generated by the neural networks can be used for various computer-related tasks, such as automatic identification of objects in the point clouds, 3D reconstruction to produce interactive 3D models, automated navigation for vehicles and/or robots, or the like.

In an embodiment, the neural network used by the system to generate 3D data points that are interpolated into a received low resolution 3D point cloud is a generative adversarial network (GAN). The GAN includes a generator network and a discriminator network, referred to herein as generator and discriminator, which are trained alternatively to generate visually plausible, although generated or "fake," results. In general, the generator is configured to generate image data representing objects, and the discriminator analyzes the generated image data to classify the image data as representing a real object or a fake object generated by the generator. The process is repeated iteratively, and the generator uses feedback from the discriminator to attempt to confuse the discriminator into classifying a generated object as a real object. Typical GANs are used with 2D images, but the GAN described herein is used with 3D point clouds. For example, the generator is configured to generate 3D data points and interpolate (meaning to map, insert, add, or fill in) the generated data points into a received low resolution point cloud to produce a super-resolved point cloud. As used herein, the terms "super-resolved" and "super-resolution" refer to an increased resolution, such that a super-resolved point cloud refers to a point cloud formed by interpolating additional (e.g., generated) 3D data points into an existing low resolution point cloud to increase the resolution of the resultant point cloud. The discriminator is configured to predict whether an object represented in the super-resolved point cloud is a real object or a fake object, and the feedback is used to train the generator how to generate data points for subsequent super-resolved point clouds.

At least one technical effect of the subject matter described herein includes generation of high resolution 3D point clouds using neural networks to increase the resolution of 3D point clouds captured by 3D range imaging devices. For example, the resolution of the point clouds captures by conventional range imaging devices can be increased without changing the hardware of the range imaging devices. By taking advantage of the adversarial nature of the GAN, the generator is capable of generating super-resolved point clouds representing objects that are perceptually indistinguishable from objects in actual or real high resolution point clouds. Thus, at least one technical effect of the subject matter described herein includes increasing the quality and resolution of 3D point clouds captured by conventional range imaging devices.

Higher quality and resolution 3D point clouds can be used for rapid and accurate identification of objects depicted in one or more point clouds for a variety of end uses, such as automated robot and/or vehicle navigation or automated inspections. For example, higher quality and resolution 3D point clouds can improve the identification and repair of damage to a component (e.g., repair of a thermal barrier coating in an engine), the automatic changing of movement of a vehicle (e.g., changing a direction of movement and/or applying brakes in response to identifying a person or other object in an image), or the like. In medical imaging applications, higher resolution 3D point clouds can improve the accuracy of identifying tumors, lesions, or the like, and can improve the planning and/or implementation of medical procedures to remove or repair the identified tumor or lesion. The higher quality and resolution 3D point clouds can also improve 3D reconstructions or models of physical objects, which can allow for more detailed inspection of the objects at a location remote from the actual physical objects. For example, a 3D model of a turbine engine can be generated on a computer, and the virtual turbine engine can be examined remotely from the engine using virtual reality.

FIG. 1 illustrates one embodiment of a neural network system 100 used for image analysis. The neural network system 100 provides automated object-of-interest detection and recognition in 2D and 3D images using one or more deep neural networks 102. The neural network 102 is an artificial neural network formed from one or more processors (e.g., microprocessors, integrated circuits, field programmable gate arrays, or the like). The neural network 102 is divided into two or more layers 104, such as an input layer 104A that receives an input image 106, an output layer 104B that outputs an output image 108, and one or more intermediate layers 104C between the input layer 104A and the output layer 104B. The layers 104 of the neural network 102 represent different groups or sets of artificial neurons or nodes, which can represent different functions performed by the one or more processors on the input image 106 to identify objects in the input image 106. The artificial neurons apply different weights in the functions applied to the input image 106 to attempt to identify the objects in the input image 106.

The output image 108 is generated by the neural network 102 by assigning or associating different pixels in the output image 108 with different object classes based on analysis of characteristics of the pixels. An object class is a type or category of an object appearing in the image. For example, a human body can be one object class, and an automobile is a different, second object class. A pixel can be labeled (e.g., associated) with probabilities that the pixel represents various different object classes by a vector [a b c d], where the values of a, b, c, and d indicate the probability of the pixel representing each of different classes of objects or things. Because the neural network 102 may not be 100% accurate in predicting what objects are represented by different pixels, the output image 108 may not exactly resemble or depict the objects in the input image 106, as shown in FIG. 1.

The artificial neurons in the layers 104 of the neural network 102 can examine individual pixels 114 that form the input image 106. The processors (operating as the artificial neurons) can use linear classification to calculate classification scores for different categories of objects (referred to herein as "classes"), such as a tree, a car, a person, spalling of a thermal barrier coating, a crack in a surface, a sign, or the like. These classification scores can indicate the probability that a pixel 114 represents different classes. For example, the classification score for a pixel 114 can be represented as a vector (e.g., the vector [a b c d] described above). The classification score is referred to herein as a classification vector. Each artificial neuron can apply a mathematical function, such as an activation function, to the same pixel, with the functions applied by different neurons impacting the functions applied by other neurons. Different neurons may apply different weights to different terms in the functions than one or more, or all other neurons. Application of the functions generates the classification vectors for the pixels 114, which can be used to identify the objects in the input image 106.

In one embodiment, the input image 106 is provided to the neural network 102 via one or more wired and/or wireless connections from a source, such as a camera or borescope. The neurons in the layers 104 of the neural network 102 examine the characteristics of the pixels 114 of the input image 106, such as the intensities, colors, or the like, to determine the classification vectors for the various pixels 114. The layers 104 of artificial neurons in the neural network 102 can examine the input image 104 in sequential order, with a first intermediate (or hidden) layer 104C of the neurons examining each pixel 114, followed by the neurons in a second intermediate layer 104C, followed by the neurons in a third intermediate layer 104C, and so on, to calculate the classification vectors of the pixels 114. The application of functions to characteristics of a pixel 114 by the neurons in a layer 104 is based on the results of the functions applied by the neurons in the preceding layers 104 in the neural network 102.

After the layers 104 of the neural network 102 have determined the classification vectors for the pixels 114, the neural network 102 examines the classification vector of each pixel 114 and determines which object class has the highest probability for each pixel 114 or which object class has a higher probability than one or more, or all, other object classes for each pixel 114. For example, a first pixel in the input image 106 having a classification vector of [0.6 0.15 0.05 0.2] indicates that the neural network 102 calculated a 60% probability that the first pixel represents a first object class (e.g., a human body or person), a 15% probability that the first pixel represents a second object class (e.g., a car), a 5% probability that the first pixel represents a third object class (e.g., a tree), and a 20% probability that the first pixel represents a fourth object class (e.g., the ground).

The output image 108 is a representation based on the determined probabilities for the pixels 114 in the input image 106. For example, different areas 116, 118 in the output image 108 are representative of the objects 110, 112, respectively, in the input image 106. The areas 116, 118 may slightly represent the corresponding objects 110, 112, but do not accurately represent or indicate the objects 110, 112 due to the probabilities in the classification vectors for at least some of the pixels 114 being less than 100%. The processors can determine that each pixel 114 represents the object class having the greatest or largest probability in the corresponding classification vector for that pixel 114. For example, the processors can determine that the first pixel described above represents a human person due to the 60% probability. This process can be repeated for several, or all, other pixels 114 in the input image 106.

The weight values associated with each vector and neuron in the network constrain how input images are related to outputs of the neurons. Weight values can be determined by the iterative flow of training data through the network. For example, weight values are established during a training phase in which the network learns how to identify particular object classes by typical input data characteristics of the objects in training or ground truth images. During the training phase, labeled training or ground truth images are input into the artificial neural network. A labeled training image is an image where all or a substantial portion of the pixels forming the image are associated with an object class. In a labeled training image, a pixel labeled as [1 0 0 0] can indicate that there is a 100% probability that the pixel represents at least a portion of an object of a first class (e.g., object class human body represented by probability a), a zero probability that the pixel represents at least a portion of an object of a different, second class (e.g., object class automobile represented by probability b), a zero probability that the pixel represents at least a portion of an object of a different, third class (e.g., object class ground represented by probability c), and a zero probability that the pixel represents at least a portion of an object of a different, fourth class (e.g., object class tree represented by probability d).

Additional training of the neural network 102 using labeled training images or ground truth images can improve the accuracy of the neural network 102 at recognizing objects in images that are input into the neural network 102, such that the objects 116, 118 in the output image 108 more closely resemble the corresponding objects 110, 112 in the input image 106. Additional training of the neural network 102 can improve the accuracy by increasing the determined probabilities that given pixels represent specific classes of the multiple object classes. The probabilities are increased by modifying the weights and/or functions of the artificial neurons in the different layers 104.

Figure 2:
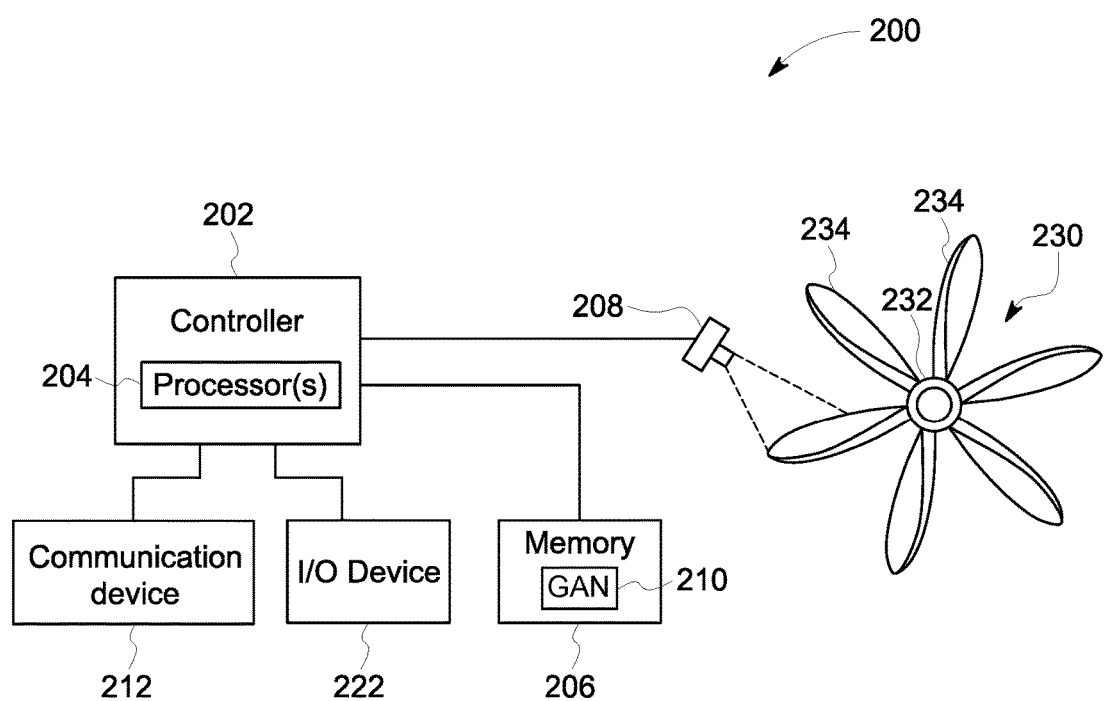
FIG. 2 is a block diagram of a neural network point cloud generation system according to an embodiment.

FIG. 2 is a block diagram of a neural network point cloud generation system 200 according to an embodiment. The point cloud generation system 200 includes one or more neural networks that may be similar to the neural network system 100 shown in FIG. 1. The point cloud generation system 200 includes a controller 202 that is operably coupled to a memory 206, which is a tangible and non-transitory computer readable medium. The controller 202 is configured to control the operation of the point cloud generation system 200. The controller 202 includes one or more processors 204. The controller 202 includes and/or represents one or more hardware circuits or circuitry that include, are connected with, or that both include and are connected with one or more processors, controllers, and/or other hardware logic-based devices. The controller 202 may include a central processing unit (CPU), one or more microprocessors, a graphics processing unit (GPU), or any other electronic component capable of processing inputted data according to specific logical instructions. For example, the controller 202 may execute instructions stored on the memory 206 or stored on another tangible and non-transitory computer readable medium.

In one embodiment, the memory 206 is a digital storage device that stores a generative adversarial network (GAN) 210, as described below with reference to FIG. 3. The memory 206 may include or represent a flash memory, RAM, ROM, EEPROM, and/or the like. The controller 202 may access the memory 206 to use the GAN 210 to produce super-resolved point clouds. The super-resolved point clouds can be used by the GAN 210 or another neural network, such as the neural network 102 (shown in FIG. 1) for automatically identifying objects in the super-resolved point clouds and/or inspecting objects in the super-resolved point clouds for damage or other anomalies. The memory 206 optionally may also store 3D image data (e.g., point clouds) that are used to train the GAN 210, or the 3D image data for training may be provided to the GAN 210 by the controller 202.

The controller 202 is configured to obtain a point cloud that comprises a set of 3D data points. The point cloud is acquired or captured from a 3D range imaging device 208. The range imaging device 208 is a scanner or camera that acquires 3D data of a target object by illuminating the target object with a pulsed laser light and measuring the reflected pulses with a sensor. Differences in laser return times and wavelengths can be used to generate the 3D data points. In an embodiment, the range imaging device 208 is a time-of-flight (ToF) range imaging camera. The range imaging device 208 may have a frequency or acquisition rate of up to 160 frames of 3D data points per second or more, but may have a resolution that is significantly lower than known 2D video cameras. The resolution of the range imaging device 208 refers to the amount of 3D data points acquired for a given volume of a 3D coordinate space. For example, the resolution of the range imaging device 208 may be less than one-fourth the resolution of some known high definition video cameras. Thus, the point cloud acquired by the range imaging device 208 has a relatively low resolution, and is referred to herein as a low resolution point cloud.

The 3D data points acquired by the range imaging device 208 include characteristics such as 3D position coordinates, intensities, colors (e.g., wavelengths), and/or relative position information. The 3D position coordinate is an (x, y, z) vector for the corresponding data point within a 3D coordinate space that includes mutually perpendicular x, y, and z axes. The point cloud can be depicted in a digital model or image. As used herein, the term "point cloud" refers to the set of 3D data points, even when the data points are not displayed in a digital model or image.

The range imaging device 208 in the illustrated embodiment is positioned and oriented to acquire the 3D image data of a rotor assembly 230, which represents the target object. The rotor assembly 230 includes a central drum or shaft 232 and multiple rotor blades 234 extending radially outward from the drum 232. The blades 234 are spaced apart along a perimeter of the drum 232. In an embodiment, the rotor assembly 230 may be a turbine used in a power plant, a turbine (or jet) engine, a turbocharger, or the like. For example, the rotor assembly 230 may be a component of a turbine engine, and the blades 234 may be airfoils of the turbine engine. The rotor assembly 230 rotates around the drum 232. The range imaging device 208 may be configured to acquire the 3D data points of the rotor assembly 230 as the rotor assembly 230 rotates or while the rotor assembly 230 is motionless. For example, the rotor assembly 230 is motionless, the range imaging device 208 may be moved relative to the rotor assembly 230 to acquire the 3D data points corresponding to different areas of the rotor assembly 230. The low resolution point cloud of the 3D data points may represent the entire rotor assembly 230 or a portion of the rotor assembly 230, such as a blade 234. In an alternative embodiment, instead of a rotor assembly, the target object captured by the range imaging device 208 may be a building or environment (e.g., for mapping purposes), a wheel or other component of a vehicle, or the like.

The controller 202 may receive the low resolution point cloud (e.g., the 3D data points) directly from the range imaging device 208 via a wired or wireless pathway. Alternatively, the range imaging device 208 may store the low resolution point cloud in an internal storage device on the range imaging device 208 or at a remote server, and the controller 202 receives the low resolution point cloud from the internal storage device or the remote server.

The controller 202 may be operably coupled to a communication device 212. The communication device 212 may include hardware such as a transceiver, receiver, transmitter, and/or the like, and associated circuitry (e.g., antennas) wirelessly communicating (e.g., transmitting and/or receiving) with the range imaging device 208. The communication device 212 may also be configured to wirelessly communicate with a remote server, a mobile device (e.g., held by an operator) or other remote computer, or the like. The communication device 212 may be configured to establish a bi-directional communication link with a communicating device, such as the range imaging device 208, using protocol firmware that may be stored in the memory 206 or another tangible and non-transitory computer readable medium. For example, the protocol firmware may provide network protocol syntax for the communication device 212 to assemble data packets, establish and/or partition data received along the bi-directional communication links, and/or the like.

Optionally, the controller 202 is operably coupled to an input/output (I/O) device 222. The I/O device 222 may include a display and/or a user interface that allows an operator to interact with the controller 202. The display may be a liquid crystal display (e.g., light emitting diode (LED) backlight), an organic light emitting diode (OLED) display, a plasma display, a CRT display, and/or the like. The display may be configured to display input images and/or output images stored in the memory 206. The user interface is configured to receive inputs from the operator of the point cloud generation system 200. The user interface may include a keyboard, a mouse, a touchpad, one or more physical buttons, and/or the like. Optionally, the display may be a touch screen display, which includes at least a portion of the user interface. Optionally, the I/O device may include additional outputs, such as audio speakers, vibrating devices, or the like, for alerting the operator.

Figure 3:
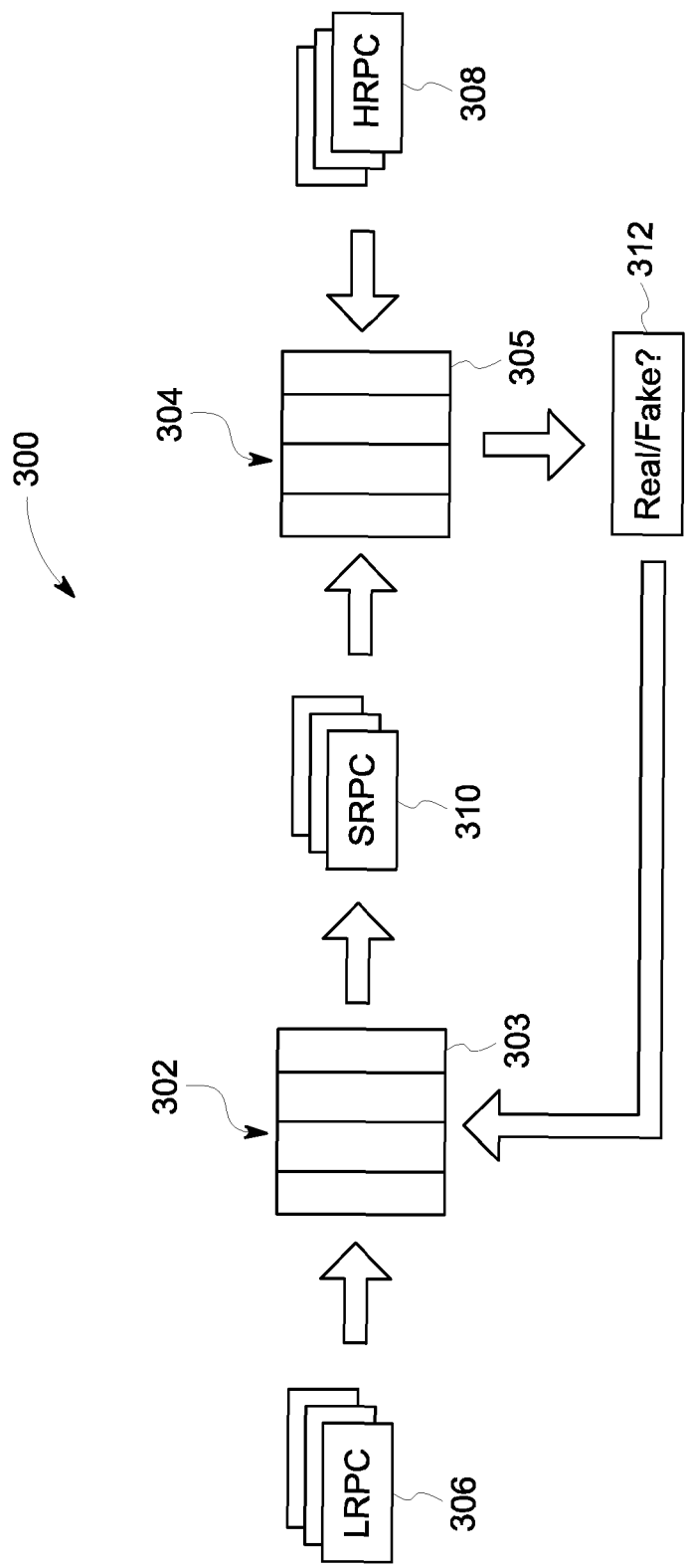
FIG. 3 illustrates one embodiment of a generative adversarial network (GAN) system.

FIG. 3 illustrates one embodiment of a GAN system 300. The GAN system 300 includes artificial neural networks, namely a generator neural network 302 and a discriminator neural network 304. The GAN system 300 may be the GAN 210 shown in FIG. 2. Each of the generator and discriminator networks 302, 304 can be an artificial neural network formed from one or more processors and composed of the layers 104 of artificial neurons, as described above. These networks 302, 304 are configured to interact in a setting of a two-player minimax game to learn how to generate generated 3D data points for producing super-resolved point clouds that are perceptually similar to original high resolution point clouds. The GAN system 300 operates differently from other, traditional deep learning techniques in that the GAN learns an underlying distribution of data (e.g., a Gaussian or other statistical distribution) that forms a 3D point cloud (or a 2D image). The generator network 302 uses the determined distribution of characteristics in the studied point clouds to generate new data points that can be added to existing low resolution point clouds to increase the resolution of the existing point clouds, producing super-resolved point clouds. The generator network 302 and the discriminator network 304 are referred to herein as generator 302 and discriminator 304, respectively.

The discriminator 304 receives various point clouds and attempts to predict or determine whether each point cloud is an original point cloud (e.g., in the form in which the 3D data was captured by a range imaging device) or is a super-resolved point cloud that is a combination of an original point cloud and generated or new data points generated by the generator 302. Based on feedback from the discriminator 304, the generator 302, over time and repetitions, is trained during a training phase to create super-resolved point clouds that are close in appearance to original point clouds. For example, once the generator 302 is trained, the discriminator 304 may mistakenly determine or predict that an object represented by a super-resolved point cloud (generated by the generator 302) is the same or at least similar to an object represented in an original point cloud.

During the training phase, the generator 302 receives a low resolution training point cloud (LRPC) 306 as an input 3D point cloud. The LRPC 306 represents at least one object, such as a blade of a rotor assembly, a portion of a body of a human or animal, a wheel or other portion of a vehicle, a tree, building, or another object. The generator 302 may receive the LRPC 306 used for training from the controller 202, another portion of the memory 206, a remote server, or the like. The LRPC 306 may represent 3D patches of data points. For example, the LRPC 306 may be acquired by the range imaging device 208 that is configured to capture point clouds with a resolution that is lower than desired, as described above. In another example, the LRPC 306 may be produced by down-sampling a higher resolution point cloud (HRPC) 308. For example, a HRPC 308 having a resolution of at least 64×64 may be down-sampled to 3D patches of 16×16 data points (or pixels). Therefore, in one or more embodiments, the GAN system 300 is trained using 3D image data, but in one or more alternative embodiments the GAN system 300 may be trained using 2D image data.

Figure 4:
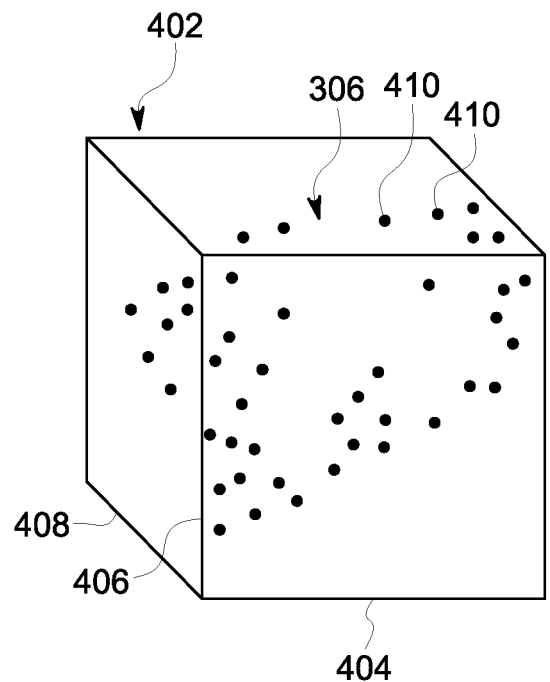
FIG. 4 shows a low resolution point cloud in a coordinate system according to an embodiment.

FIG. 4 shows a low resolution point cloud 306 in a coordinate system 402 according to an embodiment. The coordinate system 402 includes an x-axis 404, a y-axis 406, and a z-axis 408 that are mutually perpendicular. The low resolution point cloud 306 includes a set of data points 410 disposed at different coordinate positions in the system 402. The point cloud 306 represents an object that is imaged or captured by a range imaging device. But, due to the relatively low resolution (or density) of the data points 410 in a given volume of space, it is difficult to identify the type of object, much less inspect the object or gather other information about the object.

Referring now back to FIG. 3, the generator 302 examines characteristics of the data points in the LRPC 306 to determine one or more distributions of these characteristics. The generator 302 can determine the distributions (e.g., Gaussian or other statistical distributions) of data point intensities, colors, or the like, as well as absolute positions of the data points in the coordinate system and relative positions of the data points having the various characteristics. The generator 302 can determine the distribution over time by examining multiple similar LRPCs 306. For example, the generator 302 can determine the distribution of data point characteristics associated with certain objects-of-interest from several different point clouds that are known to represent the objects-of-interest, such as spalling of a selected type of coating on a selected material substrate. Thus, the multiple LRPCs 306 may be selected as point clouds that show different portions, angles, instances, or the like of spalling on an object, such as a blade of a rotor assembly in a turbine engine. The distribution is useful because it indicates the likelihood that a data point in a point cloud will have a certain set of characteristics. For example, based on the distributions of point characteristics in a point cloud representing spalling of a thermal barrier coating on a turbocharger rotor, the generator 302 can generate new data points that also resemble spalling.

The generator 302 is configured to generate new data points which are referred to as generated data points. The generated data points are generated based on the input LRPC 306 and also based on the distributions learned (e.g., determined) by the generator 302 from previously-examined training LRPC 306. For example, the generator 302 analyzes the characteristics of the data points in a specific LRPC 306, such as the relative and/or absolute locations, intensities, and colors of the data points in the LRPC 306, and generates data points for the LRPC 306 using the learned distributions.

The generator 302 interpolates the generated data points into the input LRPC 306 in order to produce a super-resolved point cloud (SRPC) 310. The SRPC 310 is a combination of the data points from the LRPC 306 that is input into the generator 302 and the generated data points. The two different sets of data points are in the same coordinate system. The SRPC 310 therefore has a greater resolution (e.g., amount of data points or pixels per unit volume) than the input LRPC 306. Optionally, the generator 302 may determine how many generated data points to generate based on the resolution of the LRPC 306 and a designated threshold resolution, such that the resolution of the SRPC 310 is at least the same or greater than the threshold resolution. The generator 302 may interpolate the generated data points into the LRPC 306 by generating data points between adjacent data points of the LRPC 306. For example, if two adjacent data points of the LRPC 306 have respective position coordinates (50, 100, 100) and (54, 100, 100), then the generator 302 may generate one or more data points having position coordinates of (51, 100, 100), (52, 100, 100), and/or (53, 100, 100), such that at least one generated data point is between the adjacent data points of the LRPC 306.

Figure 5:
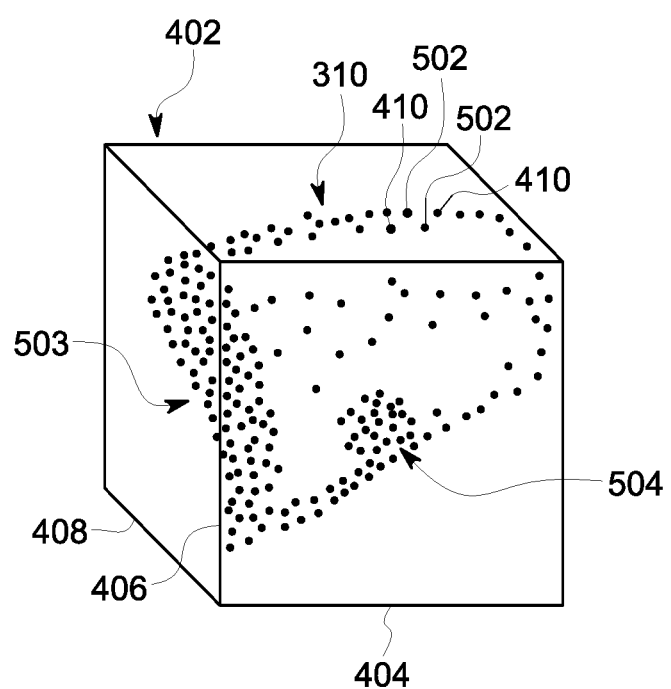
FIG. 5 shows a super-resolved point cloud in the coordinate system of FIG. 4 according to an embodiment.

FIG. 5 shows a super-resolved point cloud 310 in the coordinate system 402 of FIG. 4 according to an embodiment. The super-resolved point cloud 310 is formed by interpolating data points generated by the generator 302 into the low resolution point cloud 306 shown in FIG. 4. For example, the super-resolved point cloud 310 contains the original data points 410 that make up the low resolution point cloud 306 shown in FIG. 4, but also include new generated data points 502 created by the generator 302. In an embodiment, the generator 302 is configured to at least double the resolution of the input low resolution point cloud 306 by creating an amount of generated data points that is at least equal to the amount of data points in the low resolution point cloud 306. In an embodiment, the generator 302 is configured to generate an amount of generated data points that is at least three times the total amount of data points in the low resolution point cloud 306. Thus, a majority of the data points in the super-resolved point cloud 310 are the generated data points created by the generator 302. The super-resolved point cloud 310 is intended to represent the same object that is represented by the low resolution point cloud 306. Due to the increased resolution by adding the generated data points 502, the type of object represented by the super-resolved point cloud 310 is able to be identified as a blade or airfoil 503 of a rotor assembly. For example, the point cloud 310 more closely resembles a blade than the low resolution point cloud 306 in FIG. 4. Furthermore, the higher resolution can enable inspection of the blade by inspecting the data points 410, 502 in the point cloud 310. For example, in the illustrated embodiment, an area 504 of the point cloud 310 may be determined to be spalling of a thermal coating or barrier of the blade 503. The spalling area 504 is not detectable in the low resolution point cloud 306 shown in FIG. 4.

Referring now back to FIG. 3, it is noted that the generator 302 is configured to create generated data points that are most or more likely to occur in an actual 3D image or point cloud based on the learned distributions of data point (or pixel) characteristics that are determined by examining the training 3D image data (e.g., the series of LRPC 306 input to the generator 302). The generated data points created by the generator 302 are not merely a copy or exact replica of data points from an actual or original high resolution point cloud (e.g., the HRPCs 308 that may be down-sampled to create the training 3D image data). Because, the SRPCs 310 are created based on statistical distributions (e.g., Gaussian distributions) of the colors, locations, intensities, or the like, of the data points in the input LRPC 306, the generated SRPCs 310 are not exact copies or replicas of the HRPCs 308 or any other pre-existing point clouds.

The generated SRPCs 310 are provided to the discriminator 304 from the generator 302 via one or more wired and/or wireless connections. The discriminator 304 examines an SRPC 310 and attempts to determine, at 312 in FIG. 3, whether the SRPC 310 is a "real" high resolution point cloud that was acquired by a 3D imaging device or is a "fake" point cloud that includes generated data points from the generator 302. For example, the discriminator 304 may examine an object represented by the SRPC 310 and attempt to recognize whether the object is a real object (e.g., trees, cars, people) that exists in the world or is a fake, computer-generated object that does not exist in the world.

In one embodiment, the discriminator 304 may make the determination or prediction by comparing the received SRPC 310 to the actual high resolution point clouds (HRPCs) 308 (which are "real" point clouds that depict "real" objects). For example, the discriminator 304 (e.g., the artificial neurons in the various layers 305 of the discriminator 304) may examine characteristics of the data points in each of the SRPC 310 and the HRPCs 308, and then compare the characteristics to determine whether the SRPC 310 represents or depicts the same object as any of the HRPCs 308. For example, the HRPCs 308 may all show different representations of spalling on a blade of a rotor assembly. The discriminator 304 compares the spalling area 504 (shown in FIG. 5) in the SRPC 310 to the various examples of spalling in the HRPCs 308 to predict whether the spalling area 504 is legitimate or appears computer-generated.

The goal of the generator 302 is to mimic the actual high resolution point clouds 308 when generating the super-resolved point clouds 310 in order to fool or trick the discriminator 304 into determining that the super-resolved point clouds 310 (which are composed of a significant amount of computer-generated or "fake" data points) are original high resolution point clouds acquired by a 3D imaging device.

In an embodiment, the discriminator 304 is configured to make the prediction or determination by generating classification scores for each of the data points in the SRPC 310, which indicate probabilities that the data points represent different objects classes. The discriminator 304 then calculates a loss function or error value for the data points based on the classification scores. The discriminator 304 then examines the loss functions and compares the loss functions to one or more thresholds to determine if the data points in the SRPC 310 depict an object that is the same as or similar to an object in the HRPCs 308. For example, if the loss function or error is greater than the threshold, the discriminator 304 may not identify the SRPC 310 as depicting the object that is the same or similar to the objects in any of the HRPCs 308. But, if the loss function or error is not greater than the threshold, the discriminator 304 may identify the SRPC 310 as showing the object that is the same or similar to one or more objects appearing in at least one of the HRPCs 308. Thus, if the loss function or error is not greater than the threshold and the discriminator 304 identifies the object in the SRPC 310 as being the same or similar to an object in at least one or the HRPCs 308, the generator 302 has successfully tricked or fooled the discriminator 304.

For example, in FIG. 3, the SRPC 310 can be a first SRPC 310 created by the generator 302. The discriminator 304 examines the first SRPC and does not recognize or identify the object represented in the SRPC as being the same or similar to the objects in the HRPCs 308. For example, the loss function or error may be greater than the threshold. The discriminator 304 communicates the determination (or prediction) that the objects are not the same to the generator 302 (e.g., via one or more wired and/or wireless connections). In response, the generator 302 adjusts the weights and/or functions of the artificial neurons in the various layers 303 of the generator 302. The generator 302 then creates a different, second set of generated data points and interpolates the second set of data points into the same LRPC 306 that was previously used to create the first SRPC 310 in order to create a different, second SRPC 310. Since the generated data points in the second SRPC 310 are different from the generated data points in the first SRPC 310, the objects represented by the first and second SRPCs 310 may appear at least slightly different. The discriminator 304 examines the second created SRPC 310 and still determines that the object in the second SRPC 310 does not match (e.g., is not the same or similar to) any of the objects in the HRPCs 308. The discriminator 304 once again communicates this difference to the generator 302, and the generator 302 once again adjusts the weights and/or functions of the artificial neurons.

This back-and-forth process can continue between the generator and discriminator networks 302, 304 until the generator 302 creates an SRPC 310 that the discriminator 304 examines and determines to depict an object that is the same or at least similar to at least one of the objects depicted in the HRPCs 308. For example, the discriminator 304 may examine the characteristics of the data points in the SRPC 310 and determine that the loss function or error is not greater than the threshold. The discriminator 304 communicates this similarity or confirmation to the generator 302 (e.g., via one or more wired and/or wireless connections). In response, the generator 302 may set the weights and/or functions of the artificial neurons, meaning that the generator 302 does not adjust the weights and/or functions from the settings used to create the SRPC 310 that tricked the discriminator 304. Optionally, during the training phase of the GAN system 300, this back-and-forth process may be repeated for numerous LRPCs 306 that are used as input training 3D image data.

After the GAN system 300 is trained, the generator 302 is able to generate super-resolved point clouds 310, combining data points from actual, low resolution point clouds 306 and generated data points created by the generator 302, that the discriminator 304 cannot distinguish from actual high resolution point clouds 308. Thereafter, the trained generator 302 can be used to create super-resolved point clouds 310 that can be used for various computer tasks that rely on a level of resolution greater than an available range imaging sensor can obtain. For example, the generator 302 can receive a low resolution point cloud acquired from a 3D time-of-flight camera, and can generate a super-resolved point cloud based on the received low resolution point cloud. The super-resolved point cloud can be provided (e.g., via one or more wired or wireless connections) to other neural networks for object recognition or tracking, to computer systems for autonomous navigation or 3D reconstruction of the object depicted in the point cloud, or the like.

Figure 6:
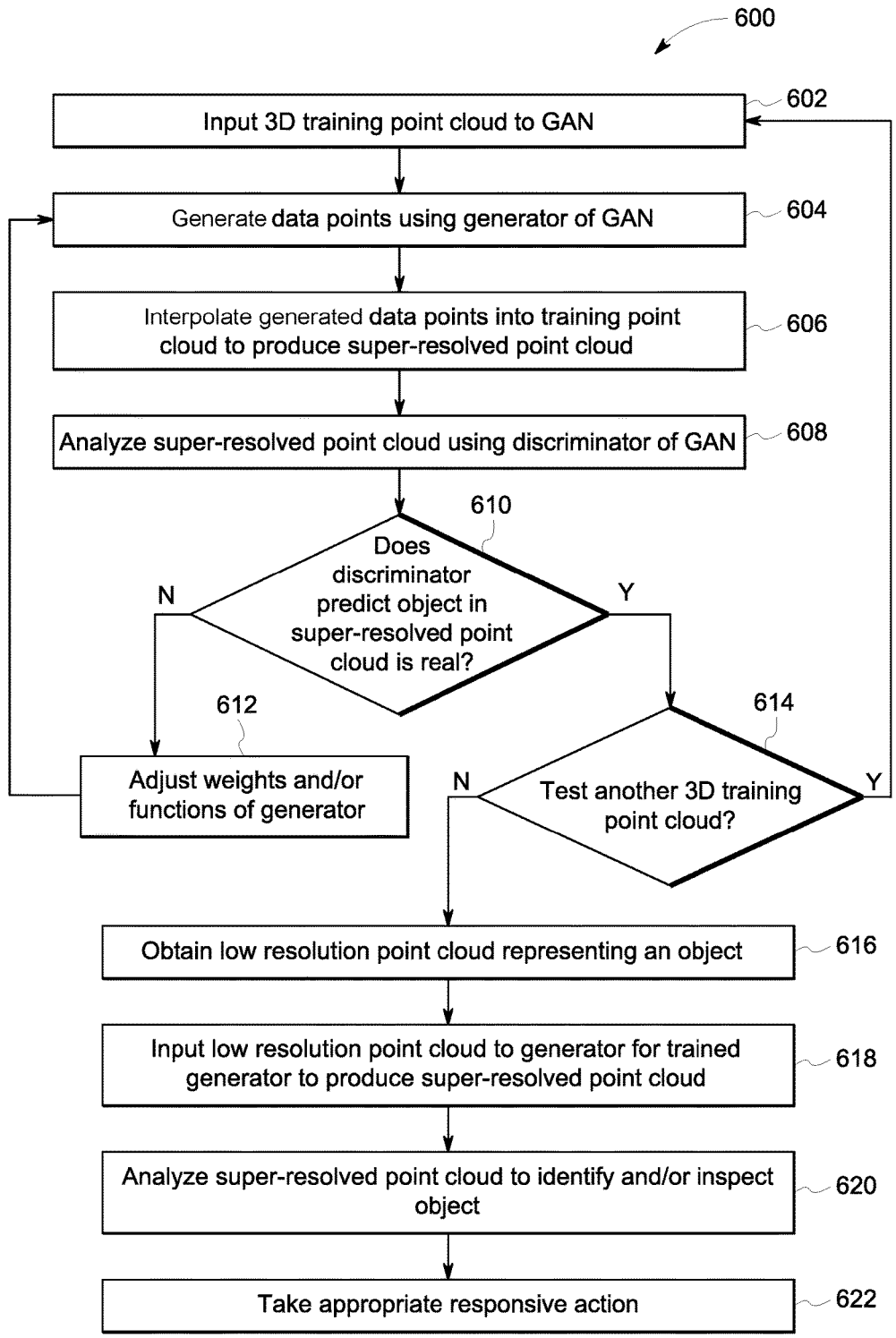
FIG. 6 is a flowchart of one embodiment of a method for generating a super-resolved point cloud using one or more deep neural networks.

FIG. 6 is a flowchart of one embodiment of a method 600 for producing a super-resolved point cloud using one or more deep neural networks. The method 600 can represent the operations performed by the one or more processors 204 of the controller 202 shown in FIG. 2 and/or processors of the GAN system 300 shown in FIG. 3 to improve the resolution of 3D image data (e.g., point clouds) acquired by range imaging devices in order to use the higher-resolution 3D point clouds for various computer tasks, such as object recognition and tracking, autonomous navigation, 3D reconstruction for inspections, mapping, and/or virtual reality, and the like. The method 600 can represent an algorithm used to create (e.g., write) one or more software applications that direct operation of one or more neural networks.

At 602, a 3D training point cloud (e.g., 3D image data) is input to a GAN system. The 3D training point cloud has a resolution of data points that is lower than a desired or threshold resolution. The data points in the 3D training point cloud represent an object, such as a blade of a rotor assembly of a turbocharger, gas turbine engine, or the like. At 604, a generator network of the GAN system generates data points. The generator generates the data points based on characteristics of the data points in the training point cloud, such as absolute or relative positions of the data points, colors, and/or intensities of the data points. The generator may generate the data points based on a learned distribution (e.g., a Gaussian distribution or other statistical distribution) of the characteristics of data points in known objects, such as known examples of spalling in a coating of a turbine blade. At 606, the generator interpolates the generated data points into the training point cloud to produce a super-resolved point cloud. The super-resolved point cloud includes the data points from the training point cloud and the generated data points created by the generator. The super-resolved point cloud therefore has a greater resolution than the training point cloud, and may have a resolution that is at least a threshold resolution. The generator may create an amount of generated data points that is greater than a total amount of the data points in the training point cloud, such that the generated data points make up a majority of the data points in the super-resolved point cloud.

At 608, the super-resolved point cloud is analyzed using a discriminator network of the GAN system. The discriminator may examine the characteristics of the data points in the super-resolved point cloud to predict, at 610, whether the object represented by the super-resolved point cloud is real or fake. For example, the discriminator may compare the object represented in the super-resolved point cloud to objects represented in a set of sample high resolution point clouds that are known to be real, actual objects present in the real world. The objects represented in the sample high resolution point clouds may be trees, people, spalling in a coating of an engine, or the like. Since the generated data points are computer-generated and not merely copies of image data, the object represented by the super-resolved point cloud may not appear to be the same or similar to actual, real, objects. If the discriminator predicts that the object represented in the super-resolved point cloud is fake, or not real, such that the discriminator does not recognize the object or determines that the object is not the same or similar to the objects represented in the sample high resolution point clouds, then flow of the method 600 continues to 612.

At 612, the weights and/or functions of the artificial neurons in the layers of the generator network are adjusted. The method 600 then returns to 604, and the generator 302 creates a different, second set of generated data points that are then combined or interpolated with the training point cloud to produce a second super-resolved point cloud. The generated data points are created based on the weights and/or functions of the artificial neurons, so adjusting the weights and/or functions results in the second set of generated data points being different than the first set. As a result, the object represented in the second super-resolved point cloud may appear differently than the object represented in the first super-resolved point cloud.

Once the discriminator predicts that the object represented in a super-resolved point cloud is real, meaning that the discriminator recognizes the object as being real or the same or similar to an object represented in at least one of the sample high resolution point clouds, then flow of the method 600 continues to 614. At 614, it is determined whether or not to test or input another 3D training point cloud to the generator of the GAN system. For example, the operations of the method 600 up to and including operation 614 may be known as a training phase of the GAN system. The training phase may not be completed until at least a threshold number of training point clouds are used to generate super-resolved point clouds that the discriminator mistakenly perceives to depict actual, real objects, and not computer-generated objects. For example, the GAN system may be trained using ten or more training point clouds.

Once the training phase is completed, flow continues to 616 and a low resolution point cloud is obtained that represents an object. The low resolution point cloud may be obtained directly from a 3D range imaging device, such as a time-of-flight camera. For example, a range imaging device may be set up to capture a set of 3D data points (comprising the low resolution point cloud) that depict at least one blade of a rotor assembly, such as on a gas turbine engine. Alternatively, the low resolution point cloud may be obtained from a memory or a server. The point cloud is referred to as a "low resolution" point cloud because the amount of data points per unit space is less than a desired or threshold amount.

At 618, the low resolution point cloud is input to the trained generator of the GAN system for the generator to produce a super-resolved point cloud. For example, the generator may produce the super-resolved point cloud as described in operations 604 and 606 by synthesizing data points based on characteristics of the data points in the input low resolution point cloud as well as a distribution of characteristics learned during the training phase. The generated data points are interpolated with the data points of the low resolution point cloud to produce the super-resolved point cloud that has a resolution greater than or equal to the desired or threshold resolution.

At 620, the super-resolved point cloud is analyzed to identify and/or inspect an object represented by the super-resolved point cloud. For example, the super-resolved point cloud may be communicated (via a wired or wireless connection) to a neural network for automated object recognition. A neural network may be configured to examine the super-resolved point cloud to detect instances of spalling or cracks on a coating of a blade. Other neural networks may be configured to detect or identify anomalies on a body part, wear patterns on a wheel of a vehicle, obstructions along a path traveled by a vehicle, or the like. The neural network that analyzes the super-resolved point cloud may be the discriminator network of the GAN system or a different neural network.

At 622, appropriate action is automatically taken in response to the analysis of the super-resolved point cloud. For example, upon detecting an anomaly such as spalling on a blade or an obstruction in a path of a vehicle, one or more processors may automatically output a signal to a controller. The signal may prompt the controller to automatically (i) activate an output device (e.g., audio speakers, lights, display, vibration device, etc.) to alert an operator, (ii) schedule maintenance for the object (e.g., a rotor system of a turbine engine), or (iii) begin repair of the object. The repair could involve, for example, spraying a restorative additive onto a thermal barrier coating of a blade of a rotor assembly. As another example, the one or more processors can output a signal to a controller for the controller to automatically stop movement or change a direction of movement of a rotor assembly, a vehicle, or the like, responsive to detecting the anomaly in the super-resolved point cloud. Automatically stopping movement of a vehicle could be implemented so as to avoid a collision between the vehicle and an obstruction identified from the super-resolved point cloud. The responsive or remedial action that is taken may depend on the type and/or properties (e.g., size, color, etc.) of the detected anomaly. For example, scheduling maintenance may be appropriate for a small crack that is detected in a blade of a rotor assembly, and automatically stopping movement of the rotor assembly may be appropriate for a large crack.

In one or more embodiments described herein, a method for recovering high resolution depth maps (i.e., 3D point clouds) from low resolution depth maps uses Deep Convolutional Generative Adversarial Networks (DCGAN). Loss functions for the DCGAN are designed to consider edge sharpness, local smoothness, and data fidelity. For example, a smoothness constraint, a sharpness constraint and a data fidelity constraint are added in the loss function of the generator. The method also includes mapping a sparse point cloud data points onto a more dense point cloud. The method may use 3D patches which generate (x, y, z) coordinate values from two-dimensional image data. In addition, a rigid transformation is applied on the 3D patches to generate training data for additional training of the DCGAN. One drawback of rigid transformations is the introduction of holes in some rotation angles, so, to avoid this issue, the number of holes is checked and patches with holes inside are removed.

In one embodiment, both a first GAN and a conditional GAN are designed. In the first GAN design, the loss function for the generator is defined as the combination of two terms—first term is $D(G(x))-1$ and the second term is the $l^2$-norm of reconstructed depth map and ground truth. In the conditional GAN design, the loss function for the generator is defined as $D(G(x))-1$, and the discriminator is $D(x, d)$ where d is the input low resolution depth map. The smoothness constraint may be realized by adding a low-pass filter on the reconstructed one and ground truth, and then calculating the $l^2$-norm. The sharpness constrain can be realized by adding a high-pass filter on the output and ground truth, and then calculating the $l^2$-norm.

The GAN framework has been experimentally evaluated. During the evaluation, 64×64 data patches were sampled and down-sampled to 16×16 pixel patches. The goal was to recover the 64×64 patches from the 16×16 patches. The GAN output was generated in addition to a bicubic interpolation output. Based on a visual comparison, the GAN output appeared very similar to the ground truth image and more closely matched the ground truth than the bicubic interpolation output. The experimental results showed the effectiveness of the embodiments of the disclosed method.

In an embodiment, a system (e.g., a point cloud generation system) is provided that includes one or more processors and a memory that stores a generative adversarial network (GAN). The one or more processors are configured to receive a low resolution point cloud comprising a set of three-dimensional (3D) data points. The low resolution point cloud represents an object. The one or more processors are configured to input the low resolution point cloud to the GAN for a generator of the GAN to generate a first set of generated data points based at least in part on one or more characteristics of the data points in the low resolution point cloud. The generator is further configured to interpolate the generated data points into the low resolution point cloud to produce a super-resolved point cloud that represents the object and has a greater resolution than the low resolution point cloud. The one or more processors are further configured to analyze the super-resolved point cloud for detecting one or more of an identity of the object or damage to the object.

Optionally, the object is a turbine engine and the one or more processors are configured to analyze the super-resolved point cloud to detect damage to a coating of the turbine engine.

Optionally, a discriminator of the GAN is configured to receive the super-resolved point cloud from the generator and to predict whether the object in the super-resolved point cloud is one or more of similar or identical to an object represented in one or more high resolution training point clouds.

Optionally, responsive to the discriminator predicting that the object in the super-resolved point cloud is not similar or identical to any object represented in any of the one or more high resolution training point clouds, the generator of the GAN is configured to generate a different, second set of generated data points that is interpolated into the low resolution point cloud to produce a revised super-resolved point cloud.

Optionally, the generator of the GAN on the memory is an artificial neural network having artificial neurons that apply weighted functions to the one or more characteristics of the data points in the low resolution point cloud to generate the generated data points. Responsive to the discriminator of the GAN predicting that the object in the super-resolved point cloud is not similar or identical to any object represented in any of the one or more high resolution training point clouds, the generator is configured to change one or more weights applied by the artificial neurons in the weighted functions prior to generating the second set of generated data points.

Optionally, the generator of the GAN interpolates the generated data points into the low resolution point cloud at coordinate positions between adjacent data points in the low resolution point cloud.

Optionally, the one or more processors are configured to receive the low resolution point cloud from a time-of-flight range imaging camera.

Optionally, the generator of the GAN is configured to generate an amount of the generated data points for the super-resolved point cloud that is at least three times more than a total amount of the data points in the low resolution point cloud.

Optionally, the one or more characteristics of the data points in the low resolution point cloud on which the generator of the GAN is configured to generate the generated data points includes one or more of 3D position coordinates, intensities, colors, or relative positions of the data points.

Optionally, the generator of the GAN is configured to generate the generated data points based at least in part on a determined distribution of one or more characteristics of data points in one or more training point clouds received by the GAN from the one or more processors during a training phase of the GAN.

In an embodiment, a method (e.g., for generating point clouds) is provided that includes obtaining a low resolution point cloud comprising a set of three-dimensional (3D) data points. The low resolution point cloud represents an object. The method includes inputting the low resolution point cloud to a generator of a generative adversarial network (GAN) trained to generate a first set of generated data points based at least in part on one or more characteristics of the data points in the low resolution point cloud. The generator is further configured to interpolate the generated data points into the low resolution point cloud to produce a super-resolved point cloud that represents the object and has a greater resolution than the low resolution point cloud. The method also includes analyzing the super-resolved point cloud for detecting one or more of an identity of the object or damage to the object.

Optionally, the object is a turbine engine and the super-resolved point cloud is analyzed to detect damage to a coating of the turbine engine.

Optionally, the method further includes predicting, using a discriminator of the GAN, whether the object in the super-resolved point cloud is one or more of similar or identical to an object represented in one or more high resolution training point clouds.

Optionally, responsive to the discriminator predicting that the object in the super-resolved point cloud is not similar or identical to any object represented in any of the one or more high resolution training point clouds, the method includes using the generator to generate a different, second set of generated data points that is interpolated into the low resolution point cloud to produce a revised super-resolved point cloud.

Optionally, the generator of the GAN is an artificial neural network having artificial neurons that apply weighted functions to the one or more characteristics of the data points in the low resolution point cloud to generate the generated data points. Responsive to the discriminator predicting that the object in the super-resolved point cloud is not similar or identical to any object represented in any of the one or more high resolution training point clouds, the method includes changing one or more weights applied by the artificial neurons in the weighted functions prior to generating the second set of generated data points.

Optionally, the method further includes training the GAN using one or more training point clouds prior to inputting the low resolution point cloud to the generator. The generator of the GAN is configured to determine a distribution of one or more characteristics of data points in the one or more training point clouds and use the distribution of the one or more characteristics to generate the first set of generated data points.

Optionally, the generator is configured to generate an amount of the generated data points for the super-resolved point cloud that is at least three times more than a total amount of the data points in the low resolution point cloud.

In an embodiment, a system (e.g., a point cloud generation system) is provided that includes a generator of a generative adversarial network (GAN) comprising one or more processors and a discriminator of the GAN comprising one or more processors. The generator is configured to receive a low resolution point cloud representing an object. The low resolution point cloud includes three-dimensional (3D) data points. The generator is configured to generate a first set of generated 3D data points and to interpolate the generated data points into the low resolution point cloud to produce a super-resolved point cloud that represents the object and has a greater resolution than the low resolution point cloud. The discriminator is configured to predict whether the object in the super-resolved point cloud is one or more of similar or identical to an object represented in one or more high resolution training point clouds. Responsive to predicting that the object in the super-resolved point cloud is one or more of similar or identical to the object represented in the one or more high resolution training point clouds, the generator is configured to communicate the super-resolved point cloud to a neural network for automated object recognition by the neural network.

Optionally, responsive to the discriminator predicting that the object in the super-resolved point cloud is not similar or identical to any object represented in any of the one or more high resolution training point clouds, the generator is configured to generate a different, second set of generated data points and to interpolate the second set into the low resolution point cloud to produce a revised super-resolved point cloud.

Optionally, the generator is configured to generate an amount of the generated data points for the super-resolved point cloud that is at least three times more than a total amount of the data points in the low resolution point cloud.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a memory that stores a generative adversarial network (GAN);
one or more processors configured to receive a low resolution point cloud comprising a set of three-dimensional (3D) data points, the low resolution point cloud representing an object, the one or more processors configured to input the low resolution point cloud to the GAN for a generator of the GAN to generate a first set of generated data points based at least in part on one or more characteristics of the data points in the low resolution point cloud, the generator further configured to interpolate the generated data points into the low resolution point cloud to produce a super-resolved point cloud that represents the object and has a greater resolution than the low resolution point cloud;
wherein the one or more processors are further configured to analyze the super-resolved point cloud for detecting one or more of an identity of the object or damage to the object; and
wherein the generator of the GAN interpolates the generated data points into the low resolution point cloud at coordinate positions between adjacent data points in the low resolution point cloud.

2. The system of claim 1, wherein the object is a turbine engine and the one or more processors are configured to analyze the super-resolved point cloud to detect damage to a coating of the turbine engine.

3. The system of claim 1, wherein a discriminator of the GAN is configured to receive the super-resolved point cloud from the generator and to predict whether the object in the super-resolved point cloud is one or more of similar or identical to an object represented in one or more high resolution training point clouds.

4. The system of claim 3, wherein, responsive to the discriminator predicting that the object in the super-resolved point cloud is not similar or identical to any object represented in any of the one or more high resolution training point clouds, the generator of the GAN is configured to generate a different, second set of generated data points that is interpolated into the low resolution point cloud to produce a revised super-resolved point cloud.

5. The system of claim 4, wherein the generator of the GAN on the memory is an artificial neural network having artificial neurons that apply weighted functions to the one or more characteristics of the data points in the low resolution point cloud to generate the generated data points, and, responsive to the discriminator of the GAN predicting that the object in the super-resolved point cloud is not similar or identical to any object represented in any of the one or more high resolution training point clouds, the generator is configured to change one or more weights applied by the artificial neurons in the weighted functions prior to generating the second set of generated data points.

6. The system of claim 1, wherein the one or more processors are configured to receive the low resolution point cloud from a time-of-flight range imaging camera.

7. The system of claim 1, wherein the generator of the GAN is configured to generate an amount of the generated data points for the super-resolved point cloud that is at least three times more than a total amount of the data points in the low resolution point cloud.

8. The system of claim 1, wherein the one or more characteristics of the data points in the low resolution point cloud on which the generator of the GAN is configured to generate the generated data points includes one or more of 3D position coordinates, intensities, colors, or relative positions of the data points.

9. The system of claim 1, wherein the generator of the GAN is configured to generate the generated data points based at least in part on a determined distribution of one or more characteristics of data points in one or more training point clouds received by the GAN from the one or more processors during a training phase of the GAN.

10. A method comprising:
obtaining a low resolution point cloud comprising a set of three-dimensional (3D) data points, the low resolution point cloud representing an object;
inputting the low resolution point cloud to a generator of a generative adversarial network (GAN) trained to generate a first set of generated data points based at least in part on one or more characteristics of the data points in the low resolution point cloud, the generator further configured to interpolate the generated data points into the low resolution point cloud to produce a super-resolved point cloud that represents the object and has a greater resolution than the low resolution point cloud; and
analyzing the super-resolved point cloud for detecting one or more of an identity of the object or damage to the object;
wherein the generator of the GAN interpolates the generated data points into the low resolution point cloud at coordinate positions between adjacent data points in the low resolution point cloud.

11. The method of claim 10, wherein the object is a turbine engine and the super-resolved point cloud is analyzed to detect damage to a coating of the turbine engine.

12. The method of claim 10, further comprising predicting, using a discriminator of the GAN, whether the object in the super-resolved point cloud is one or more of similar or identical to an object represented in one or more high resolution training point clouds.

13. The method of claim 12, wherein, responsive to the discriminator predicting that the object in the super-resolved point cloud is not similar or identical to any object represented in any of the one or more high resolution training point clouds, the method includes generating, using the generator, a different, second set of generated data points that is interpolated into the low resolution point cloud to produce a revised super-resolved point cloud.

14. The method of claim 13, wherein the generator of the GAN is an artificial neural network having artificial neurons that apply weighted functions to the one or more characteristics of the data points in the low resolution point cloud to generate the generated data points, and, responsive to the discriminator predicting that the object in the super-resolved point cloud is not similar or identical to any object represented in any of the one or more high resolution training point clouds, the method includes changing one or more weights applied by the artificial neurons in the weighted functions prior to generating the second set of generated data points.

15. The method of claim 10, further comprising training the GAN using one or more training point clouds prior to inputting the low resolution point cloud to the generator, the generator of the GAN configured to determine a distribution of one or more characteristics of data points in the one or more training point clouds and use the distribution of the one or more characteristics to generate the first set of generated data points.

16. The method of claim 10, wherein the generator is configured to generate an amount of the generated data points for the super-resolved point cloud that is at least three times more than a total amount of the data points in the low resolution point cloud.

17. A system comprising:
a generator of a generative adversarial network (GAN) comprising one or more processors, the generator configured to receive a low resolution point cloud representing an object, the low resolution point cloud including three-dimensional (3D) data points, the generator configured to generate a first set of generated 3D data points and to interpolate the generated data points into the low resolution point cloud to produce a super-resolved point cloud that represents the object and has a greater resolution than the low resolution point cloud; and
a discriminator of the GAN comprising one or more processors, the discriminator configured to predict whether the object in the super-resolved point cloud is one or more of similar or identical to an object represented in one or more high resolution training point clouds; and
responsive to predicting that the object in the super-resolved point cloud is one or more of similar or identical to the object represented in the one or more high resolution training point clouds, the generator is configured to communicate the super-resolved point cloud to a neural network for automated object recognition by the neural network;
wherein the generator of the GAN interpolates the generated data points into the low resolution point cloud at coordinate positions between adjacent data points in the low resolution point cloud.

18. The system of claim 17, wherein, responsive to the discriminator predicting that the object in the super-resolved point cloud is not similar or identical to any object represented in any of the one or more high resolution training point clouds, the generator is configured to generate a different, second set of generated data points and to interpolate the second set into the low resolution point cloud to produce a revised super-resolved point cloud.

19. The system of claim 17, wherein the generator is configured to generate an amount of the generated data points for the super-resolved point cloud that is at least three times more than a total amount of the data points in the low resolution point cloud.

20. The system of claim 3, wherein the discriminator is configured to make the prediction by generating classification scores for each of the data points in the super-resolved point cloud.

21. The system of claim 20, wherein the discriminator calculates a loss function for the each of the data points in the super-resolved point cloud based on the classification scores.

22. The system of claim 21, wherein the discriminator compares the loss functions to one or more thresholds to determine if the object in the super-resolved point cloud is one or more of similar or identical to the object represented in one or more high resolution training point clouds.

* * * * *